United States Patent
Hirose et al.

(10) Patent No.: US 7,578,565 B2
(45) Date of Patent: Aug. 25, 2009

(54) CRAWLER BELT, CRAWLER UNIT AND METHOD FOR MANUFACTURING CRAWLER BELT

(75) Inventors: Shigeo Hirose, Tokyo (JP); Shingo Tsukui, Toyohashi (JP)

(73) Assignees: Tokyo Institute of Technology, Tokyo (JP); Topy Kogyo Kabushiki Kaisha, Tokyo (JP)

( * ) Notice: Subject to any disclaimer, the term of this patent is extended or adjusted under 35 U.S.C. 154(b) by 228 days.

(21) Appl. No.: 10/580,127

(22) PCT Filed: Nov. 18, 2004

(86) PCT No.: PCT/JP2004/017161

§ 371 (c)(1),
(2), (4) Date: May 19, 2006

(87) PCT Pub. No.: WO2005/049414

PCT Pub. Date: Jun. 2, 2005

(65) Prior Publication Data

US 2007/0145820 A1 Jun. 28, 2007
US 2008/0272647 A9 Nov. 6, 2008

(30) Foreign Application Priority Data

Nov. 20, 2003 (JP) ............................. 2003-390483

(51) Int. Cl.
*B62D 55/24* (2006.01)
(52) U.S. Cl. .................. 305/165; 305/166; 305/169
(58) Field of Classification Search ................. 305/116, 305/120, 157, 165–167, 169–170, 178, 193–195, 305/184, 6–7, 168, 199, 19, 158–164, 171–177, 305/179, 181, 53; 474/152–153, 202
See application file for complete search history.

(56) References Cited

U.S. PATENT DOCUMENTS

| 3,120,409 A | 2/1964 | Beall |
| 3,498,684 A | 3/1970 | Hallaman |
| 4,568,320 A * | 2/1986 | Tangorra ................... 474/152 |

(Continued)

FOREIGN PATENT DOCUMENTS

CN 1051019 5/1991

(Continued)

OTHER PUBLICATIONS

Supplementary European Search Report issued in EP Application No. 04818947 dated Feb. 6, 2007 (3 pages).
Notification of Examiner's Reasons of Rejection issued in corresponding Japanese Patent Application No. 2005-515640; Dated Feb. 13, 2007; 3 pages (non-English).
English translation of Notification of Examiner's Reasons of Rejection issued in corresponding Japanese Patent Application No. 2005-515640; Dated Feb. 13, 2007; 4 pages.
International Search Report for PCT/JP2004/017161 dated Mar. 8, 2005) (1 page).

(Continued)

*Primary Examiner*—Jason R Bellinger
(74) *Attorney, Agent, or Firm*—Osha • Liang LLP

(57) ABSTRACT

A crawler belt is disclosed herein having an endless steel belt (high-tensile-strength belt) and a belt main body made of rubber and attached around an outer periphery of the steel belt. The steel belt has engagement holes arranged at even intervals in a circumferential direction thereof. The belt main body has escape recesses formed therein. A wheel has projections arranged at even intervals in a circumferential direction on an outer peripheral surface thereof. The projections are adapted to be engaged with the engagement holes of the steel belt and at the same time to enter the escape recesses of the belt main body.

9 Claims, 11 Drawing Sheets

U.S. PATENT DOCUMENTS

| | | | | |
|---|---|---|---|---|
| 4,573,953 A | * | 3/1986 | Tangorra | 474/152 |
| 4,681,377 A | * | 7/1987 | Atkin et al. | 305/166 |
| 4,953,921 A | * | 9/1990 | Burns | 305/165 |
| 6,386,654 B1 | * | 5/2002 | Singer et al. | 305/194 |
| 2005/0116540 A1 | | 6/2005 | Katoh et al. | |

FOREIGN PATENT DOCUMENTS

| | | |
|---|---|---|
| DE | 3435486 A1 | 4/1985 |
| EP | 1211169 A2 | 6/2002 |
| FR | 1013382 | 7/1952 |
| GB | 2138534 A | 10/1984 |
| GB | 2229410 A | 9/1990 |
| JP | 46-23526 | 8/1971 |
| JP | 56-14508 | 4/1981 |
| JP | 3-109988 | 11/1991 |
| JP | 6-156333 | 6/1994 |
| JP | 6-199253 | 7/1994 |
| JP | 6-329057 | 11/1994 |
| JP | 08-11550 | 2/1996 |
| JP | 2002-211455 | 7/2002 |
| JP | 2003-327176 | 11/2003 |
| WO | WO-87/02953 | 5/1987 |
| WO | WO-03/078239 | 9/2003 |

OTHER PUBLICATIONS

Patent Abstracts of Japan 2002-211455 dated Jul. 31, 2002 (1 page).
Patent Abstracts of Japan 06-156333 dated Jun. 3, 1994 (1 page).
Patent Abstracts of Japan 06-329057 dated Nov. 29, 1994 (1 page).
Patent Abstracts of Japan 06-199253 dated Jul. 19, 1994 (1 page).
Notification of Examiner's Reasons of Rejection issued in corresponding Japanese Patent Application No. 2003-390483; Dated Aug. 29, 2006; 4 pages (non-English).
Concise Explanation of Relevance of Chinese Publication 105019A, Publication Date May 1, 1991, 1 page.

* cited by examiner

CRAWLER BELT, CRAWLER UNIT AND METHOD FOR MANUFACTURING CRAWLER BELT

TECHNICAL FIELD

This invention relates to a crawler belt and a crawler unit used in a crawler structure of a light-weight robot, etc. and a method for manufacturing the crawler belt.

BACKGROUND ART

Rubber crawler belts to be used in a light-weight robot, etc. have been developed. The crawler belts have tread lugs on outer periphery thereof and equally-spaced projections for engaging with a wheel or a sprocket on inner periphery thereof. Such crawler belts, however, tend to stretch too much, go slack and come off the wheel after long use. Sometimes they may break due to lack of strength. If the crawler belts are increased in thickness to overcome these shortcomings, they are increased in weight, too.

To address the above-mentioned problem, technologies have been developed to reinforce the crawler belts by embedding an endless high-tensile-strength belt made of thin metal belt, etc. in a rubber-made main body of the crawler belt as disclosed in the patent documents 1 to 3 listed below.

Patent Document 1: Japanese Patent Application Laid-Open No. H6-156333

Patent Document 2: Japanese Patent Application Laid-Open No. H6-199253

Patent Document 3: Japanese Patent Application Laid-Open No. H6-329057

SUMMARY OF THE INVENTION

Crawler belts disclosed in the Patents Documents 1 to 3 may be enhanced in strength, but can be reduced in weight only to a limited degree due to projections for engaging with a wheel or a sprocket.

Recently, a robot for searching and rescuing people trapped under the rubble at the time of disasters such as an earthquake and other light-duty robots have been developed. In such light-weight robots, further reduction in weight of a crawler unit is desired. However, reinforced crawler belts as disclosed in the above-listed patent documents fail to meet the demand of weight reduction.

The present invention has been made in order to solve the above mentioned problem. According to the present invention, there is provided a crawler belt comprising an endless high-tensile-strength belt (21) and a belt main body (22) made of elastic material and attached to an outer periphery of the high-tensile-strength belt, the high-tensile-strength belt (21) having engagement holes (21a) arranged at even intervals in a circumferential direction thereof the belt main body (22) having escape recesses (23a) formed at locations corresponding to the engagement holes of the high-tensile-strength belt.

According to the present invention, there is also provided a crawler unit comprising a plurality of wheels (10) disposed separately in a front and rear direction and a crawler belt (20) trained about the wheels, wherein the crawler belt (20) comprises an endless high-tensile-strength belt (21) and a belt main body (22) made of elastic material and attached to an outer periphery of the high-tensile-strength belt, the high-tensile-strength belt (21) having engagement holes (21a) arranged at even intervals in a circumferential direction thereof, the belt main body having escape recesses (23a) formed at locations corresponding to the engagement holes of the high-tensile-strength belt, and wherein a driving wheel of the plurality of wheels (10) has engagement projections (12a) arranged at even intervals in a circumferential direction on an outer peripheral surface thereof, the engagement projections (12a) being adapted to be engaged with the engagement holes (21a) of the high-tensile-strength belt (21) of the crawler belt (20) and at the same time to enter the escape recesses (23a) of the belt main body (22).

In the crawler belt and the crawler unit as constructed above, owing to the endless high-tensile-strength belt incorporated in the crawler belt, the crawler belt has a high tensile strength and is free from undesirable events such as having been stretched too much and coming off the wheel. It is free from breakage, either. Moreover, since the engagement holes are formed on the high-tensile-strength belt and the projections of the wheel are adapted to be engaged with the engagement holes, the belt main body made of elastic material is not required to have projections for engaging with a wheel. This further contributes to the reduction of weight.

Preferably, outer peripheral surfaces of the plurality of wheels (10) are generally cylindrical surfaces. More preferably, the engagement holes (21a) of the high-tensile-strength belt (21) have a generally circular shape and the engagement projections (12a) of the wheel (10) have a generally semi-spherical shape. This contributes to the reduction of noise.

Preferably, the crawler unit further comprises a pair of side plates (30) extending in a front and rear direction to cover opposite side surfaces of the plurality of wheels (10), the belt main body (22) comprising an endless base part (23) and shielding flanges (24, 24') continuously formed along an entire length on opposite sides of the base part, edges of the shielding flanges contacting peripheral edges of the side plates. The shielding flanges serves to shield an inner space between the side plates, thus preventing foreign substances such as sand and dusts from entering between the crawler belt and the wheels.

More preferably, the shielding flange has a tapered cross-section and is elastically deformed as it contacts semi-circular peripheral edges of a front and rear end portions of the side plate. A part of the crawler belt which is placed around the wheel is subjected to a force to cause the edge of the shielding flange to be waved. But the edge of the shielding flange can contact the side plate securely without being waved because the edge part of the shielding flange is elastically deformed as it contacts the side plates.

More preferably, upper and lower edges of the side plates located between the wheels are made of a seal member, the seal member having smaller elastic coefficient than the shielding flange, the seal member being deformed as it contacts the edge of the shielding flange. This permits the shielding flange and the seal member to be securely maintained in contact with each other even when the crawler belt flap between the wheels.

Preferably, the belt main body (22) includes an endless base part (23) and a plurality of tread lugs (26) formed spacedly on the outer periphery of and extending in a width direction of the base part (23), the tread lugs having a planer shape bent at least at one point, height of the tread lugs being not less than 3 times and not greater than 7 times as large as its thickness. This enables a robot, etc. to keep running without slipping even if it encounters the rubble, etc. as it runs on the unleveled ground, by allowing the tread lugs to be elastically deformed and grip the rubble, etc. Moreover, although the tread lugs are high and slim, they can support the self-weight of the robot, etc. since they have bent planer shapes.

According to the present invention, there is provided a method for manufacturing a crawler belt, the method comprising steps of:

preparing a first mold (70) having a plurality of mold projections (74a) arranged at even intervals on a molding surface thereof and a second mold (80) having a plurality of lug mold recesses (86) opening at a molding surface thereof;

setting an endless high-tensile-strength belt (21) having engagement holes (21a) arranged at even intervals in a circumferential direction thereof on the first mold (70) by fitting the mold projections (74a) into the engagement holes; and molding an elastic material between the first mold and the second mold to obtain a belt main body (22) or a part (22') of the belt main body (22) attached to an outer periphery of at least a part of the high-tensile-strength belt, at the same time forming escape recesses (23a) by allowing the molding projections (74a) of the first mold (70) to press into the elastic material and forming tread lugs (26) by allowing the elastic material to enter the lug mold recesses (86) of the second mold (80).

In the method described above, a positioning device is not necessary because the engagement holes of the high-tensile-strength belt can be used as a positioning device. Moreover, the tread lugs can be molded easily and inexpensively because molding is accomplished by allowing the elastic material to enter the lug mold recess.

According to the present invention, there is further provided a method for manufacturing a crawler belt, the method comprising steps of:

preparing a lower mold (70) having a plurality of mold projections (74a) arranged at even intervals on an upper surface thereof and an upper mold (80) having a plurality of lug mold recesses (86) opening at an lower surface thereof;

positioning an endless high-tensile-strength belt (21) having engagement holes (21a) arranged at even intervals in a circumferential direction thereof by placing a part of the high-tensile-strength belt (21) on the lower mold (70) and by fitting the mold projections (74a) of the lower mold into the engagement holes of the high-tensile-strength belt;

placing an elastic material on said lower mold and lowering said upper mold to mold a part (22') of a belt main body (22) on an outer periphery of the high-tensile-strength belt (21) between the upper mold and the lower mold, at the same time forming escape recesses (23a) by allowing the mold projections (74a) of the lower mold (70) to press into the elastic material, and forming tread lugs (26) by allowing the elastic material to enter the lug mold recesses (86) of the upper mold (80); and molding the endless belt main body (22) all around the periphery of the high-tensile-strength belt (21) by moving the high-tensile-strength belt (21), to place a new part of the high-tensile-strength belt (21) on the lower mold (70), the new part adjoining the part where the part (22') of the belt main body (22) was molded, molding another part (22') of the belt main body on said new part of said high-tensile-strength belt in the foregoing way, and by repeating the procedure.

In the method described above, the crawler belt can be manufactured easily and inexpensively without using expensive equipment. Moreover, a positioning device is not necessary because the engagement holes of the high-tensile-strength belt can be used as a positioning device. Moreover, the tread lugs can be molded easily and inexpensively because molding is accomplished by allowing the elastic material to enter the lug mold recess. Furthermore, crawler belts of various circumferential lengths can be manufactured with the same equipment.

Preferably, mold pins (74) are removably inserted into the upper surface of the lower mold (70) and head parts of the mold pins are provided as the mold projections (74a). By this, after molding, the molded part of the belt main body and the high-tensile-strength belt can be removed from the lower mold without substantial resistance, which contributes to significantly improve productivity.

According to the present invention, a crawler belt with high strength and light weight can be obtained. By using the method according to the present invention, a crawler belt incorporating a high-tensile-strength belt can be manufactured easily and inexpensively.

DETAILED DESCRIPTION OF THE INVENTION

Figure 1:
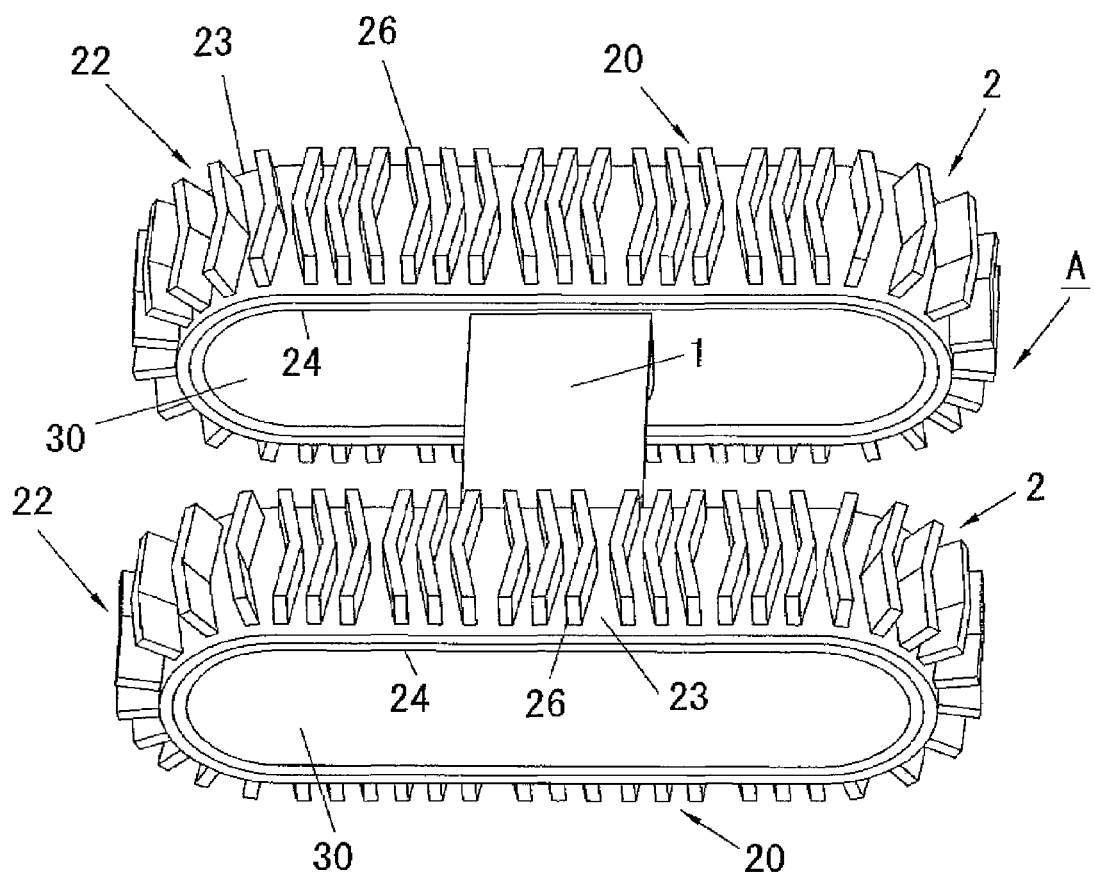
FIG. 1 is a perspective view of a crawler structure of a robot having a pair of left and right crawler units according to a first embodiment of the present invention.

First embodiment of the present invention is described below referring to FIGS. 1 to 11. FIG. 1 shows a crawler structure A, which constitutes a lower body of a light-duty robot. The crawler structure comprises a mounting base 1 and a pair of crawler units 2 attached to the left and right of the mounting base 1. An upper body of the robot is mounted on the mounting base 1. The upper body may be of various constructions, according to the role of the robot. For example, a robot for searching people trapped under the rubble at the time of disasters such as an earthquake has a camera, a detection sensor and an illuminating device, and a grasping mechanism for grasping light-weight items, according to necessity.

Figure 2:
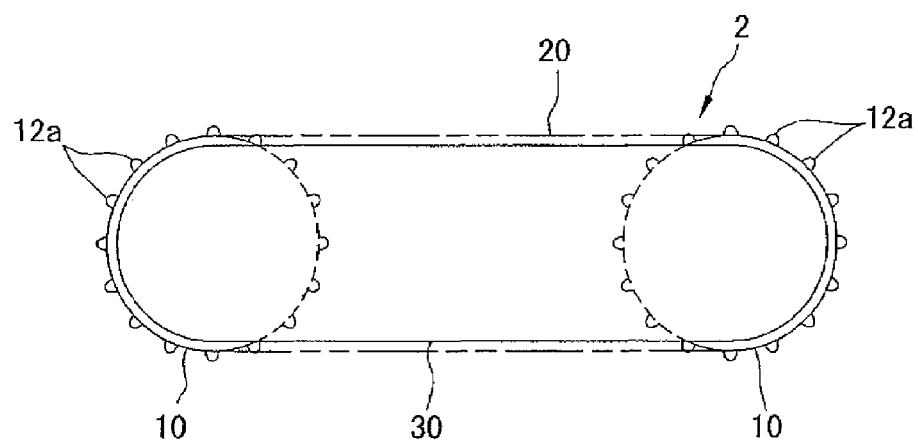
FIG. 2 is a side view of the crawler unit.

As shown in FIGS. 1 and 2, each of the crawler units 2 comprises wheels 10 in the front and rear, an endless crawler belt 20 trained about the wheels 10 and a pair of side plates 30 rotatably supporting the wheels 10 in the front and rear. The side plate 30 of each of crawler units 2 located on an inner side is attached to the mounting base 1 at the central portion of the side plate 30.

The left and right crawler units 2 are substantially of the same construction. In each of the crawler units 2, either one of the wheels 10 in the front or in the rear is connected to an actuator (not shown) such as an electric motor provided on the side plate 30 on the inner side and serves as a driving wheel and the other of the wheels serves as a trailing wheel.

Figure 4:
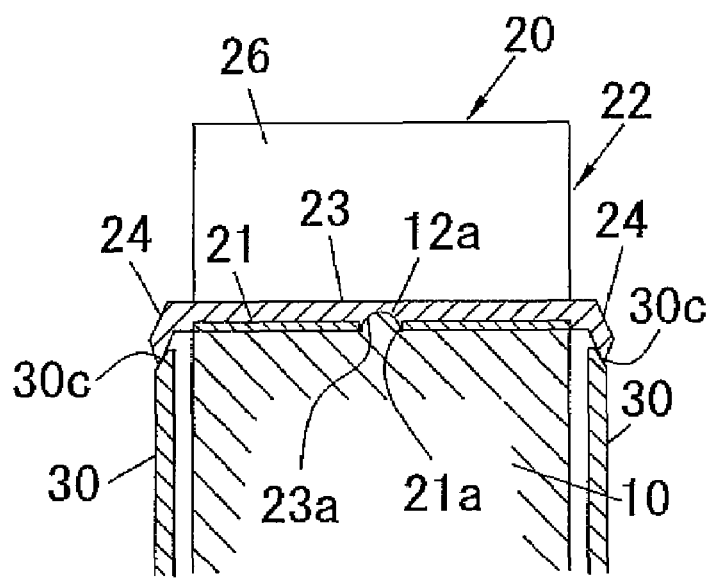
FIG. 4 is a longitudinal sectional view of the crawler belt in a state of being placed around a wheel.
Figure 5:
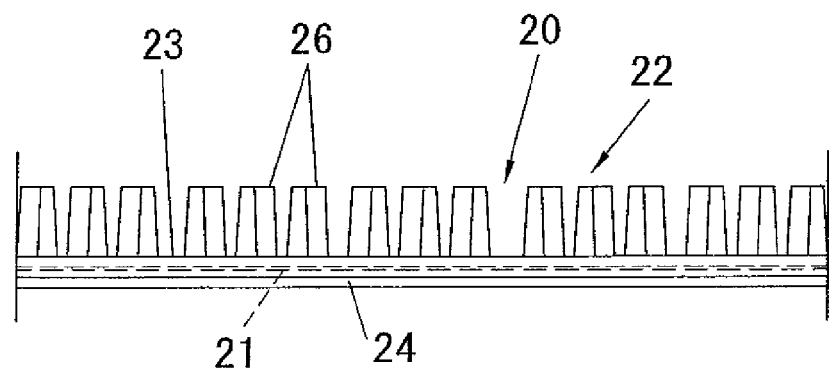
FIG. 5 is a side view of the crawler belt.

As shown in FIGS. 2 and 4, outer peripheral surface of the each of the wheels 10 is a cylindrical surface. The wheel 10 has semi-spherical engagement projections 12a arranged at even intervals in a circumferential direction at a center in a width direction of the outer peripheral surface thereof. In this embodiment, a diameter of the engagement projection 12a is around 3 millimeters while a width of the wheel 10 is 30 millimeters.

As shown in FIGS. 2 and 4, the pair of side plates 30 are disposed to the left and right of the pair of wheels 10. Each of the side plates 30 is in a shape of an oblong plate elongated in a front and rear direction. Front and rear end portions of the side plates 30 cover opposite side surfaces of the pair of wheels 10. Peripheral edges of front and rear end portions of the side plates 30 are of a semi-circular shape corresponding to the shape of peripheral edges of the wheel 10.

As shown in FIG. 4, the peripheral edge of the side plate 30 has a tapered cross section all around the periphery and its outer face is an inclined surface 30c.

Figure 3:
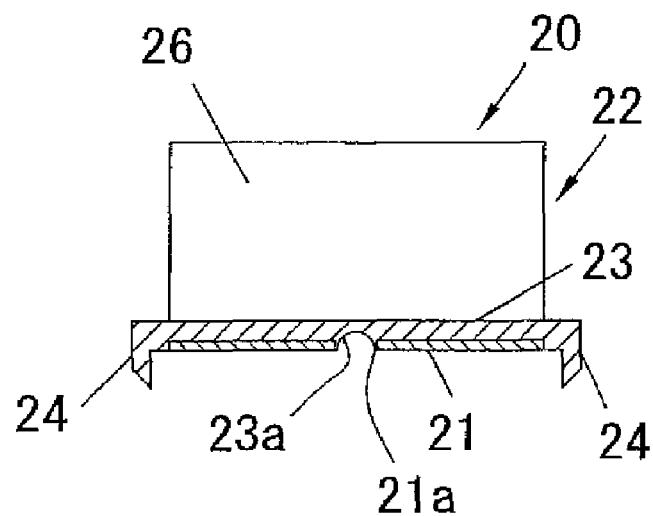
FIG. 3 is a longitudinal sectional view of a crawler belt used in the crawler unit with a thickness of a steel belt exaggerated.

As shown in FIG. 3, the crawler belt 20 includes an endless steel belt 21 made of stainless steel (or a thin metal belt or a high-tensile-strength belt) and an endless belt main body 22, the belt main body 22 being made of rubber (or an elastic material) such as SBR and urethane rubber and being attached all around the outer periphery of the steel belt 21 by vulcanization bonding, etc.

The steel belt 21 is constructed by welding opposite ends of an elongated thin belt of a plate thickness of from 0.05 to 1.0 millimeters (0.15 millimeters in this embodiment). A width of the steel belt 21 is generally same as that of the wheel 10. The steel belt 21 has circular engagement holes 21a arranged at even intervals (the same interval as that of the engagement projections 12a of the wheel 10) in a circumferential direction at a center in the width direction thereof. A diameter of the engagement holes 21a is the same as or a slightly greater than that of the engagement projections 12a.

The steel belt 21 according to this embodiment is extremely thin compared with a base part 23 (of a thickness of 3 millimeters) to be described later. The thickness of the steel belt 21 is exaggerated in drawings.

As shown in FIGS. 1 and 3, the belt main body 22 integrally includes an endless base part 23 of a width greater than that of the steel belt 21, a shielding flange 24 formed on opposite sides in a width direction of the base part 23 and tread lugs 26 spacedly formed on an outer periphery of the base part 23. The base part 23 has generally semi-spherical escape recesses 23a arranged at center in the width direction thereof, at locations corresponding to the engagement holes 21a of the steel belt 21 to communicate with the engagement halls 21a.

The crawler belt 20 is placed around half of the periphery of the wheels 10 in the front and rear. As shown in FIG. 4, in an area covering half of the periphery of the wheel 10, the steel belt 21 contacts the outer peripheral surface of the wheel 10 directly, the engagement projections 12a of the wheel 10 engaging the engagement holes 21a of the steel belt 21 and at the same time entering the escape recesses 23a of the base part 23.

The shielding flange 24 is formed continuously all around the periphery of the belt main body 22. The shielding flange 24 extends radially inward from the base part 23. The outer surface of the edge of the shielding flange 24 is an inclined surface. By this, the shielding flange 24 is given a tapered cross section, thereby being allowed to be deformed easily.

Figure 6:
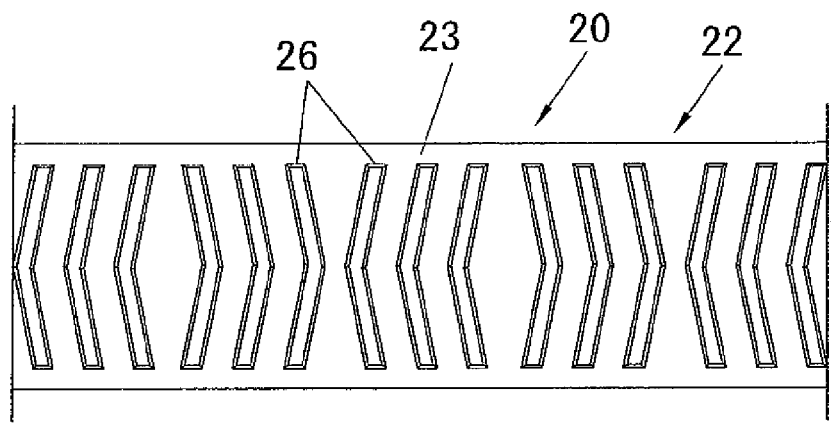
FIG. 6 is a plan view of the crawler belt.

The tread lug 26 extends in a width direction of the crawler belt 20 and has a trapezoidal longitudinal section. In this embodiment, a thickness of the tread lug 26 is 5 millimeters in lower base and 3 millimeters in upper base in longitudinal section while its height is 15 millimeters. The tread lug 26 is of an extremely small thickness for its height and, therefore, has a small flexural rigidity. As a result, the tread lug 26 is easy to bend when a force in a longitudinal direction of the crawler belt 20 is applied. Preferably, the height of the tread lug 26 is not less than 3 times and not greater than 7 times as large as its thickness (an average thickness or a thickness at center in a height direction). More preferably, the height of the tread lug 26 is not less than 3.5 times and not greater than 5 times as large as its thickness. If the height of the tread lug 26 is less than 3 times as large as its thickness, the flexural rigidity of the tread lug 26 is not small enough. If the height of the tread lug 26 is greater than 7 times as large as its thickness, the tread lug 26 is not strong enough in the height direction. The tread lug 26 has a planer shape bent at the center as shown in FIG. 1. The bending adds to the strength of the tread lug 26 against load in height direction, i.e. self-weight of the robot. In this embodiment, as shown in FIG. 6, bending direction of the tread lugs 26 is changed every few tread lugs 26.

In a robot of the above mentioned construction, when the actuators of the crawler units 2 in the left and right are driven, the crawler belt 20 is rotated by rotation of the wheels 10 connected to the actuators. As a result, the robot moves.

Although the belt main body 22 used in the crawler belt 20 is made of rubber, since it is reinforced with the steel belt 21, it does not stretch even after long use and can be prevented from coming off the wheel 10. Moreover, the crawler belt 20 can be greatly reduced in weight. The first reason is that the crawler belt 20 is reinforced with the thin steel belt 21 without being increased in thickness. The second reason is that the belt is engaged with the wheel 10 via the steel belt 21, which eliminates the necessity of forming projections for engaging with the wheel 10 or a sprocket on the belt main body 22 (refer to the above-mentioned prior art documents).

The crawler belt 20 can be surely prevented from coming off the wheel 10 in a left and right direction since the projections 12a of the wheel 10 fit into the engagement holes 21a of the steel belt 21.

Figure 7:
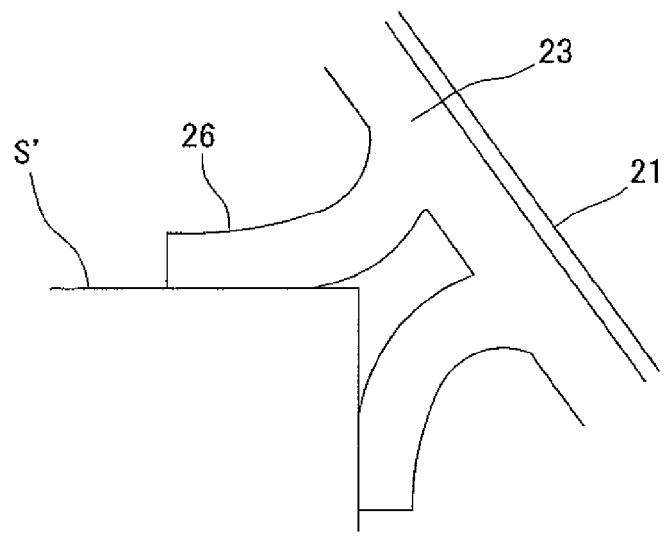
FIG. 7 is a schematic view of tread lugs of the crawler belt as they are gripping rubble.

In this embodiment, since flexible tread lugs 26 are provided, the robot can easily move over relatively low rubble S' having a flat surface as shown in FIG. 7. It is because the tread lugs 26 are elastically deformed and, accordingly, contact area with the rubble S' is increased. This allows the tread lugs 26 to grip the rubble S' well without slipping, and therefore idle running of the crawler belt 20 can be avoided. This function is very helpful especially when the rubble S' is wet or sands adhere to the rubble S'. As shown in FIG. 7, the rubble S' can be gripped more securely with the two adjoining tread lugs 26 by reducing interval between adjoining tread lugs 26.

Although the tread lug 26 is easy to bend, it is strong enough and is not deformed too much against load in height direction, i.e. the self-weight of the robot, which allows the robot to keep moving smoothly. It is because the tread lug 26 has a bent planer shape, and therefore has high strength in height direction.

The shielding flange 24 of the belt main body 22 contacts the inclined surface 30c of the side plate 30 at the peripheral edge of the side plate 30 with the shielding flange being elastically deformed. As a result, an inner space surrounded by the crawler belt 20 and the pair of side plates 30 is sealed, thereby preventing foreign substances such as water, sands and dust from entering into the inner space.

A part of the crawler belt 20 which is placed around half of the periphery of the wheels 10 is subjected to a force to cause the shielding flange 24 to be waved. But the shielding flange 24 can contact the peripheral edge of the side plate 30 securely without being waved because the shielding flange 24 is elastically deformed as it contacts the peripheral edge of the side plates 30.

Figure 8:
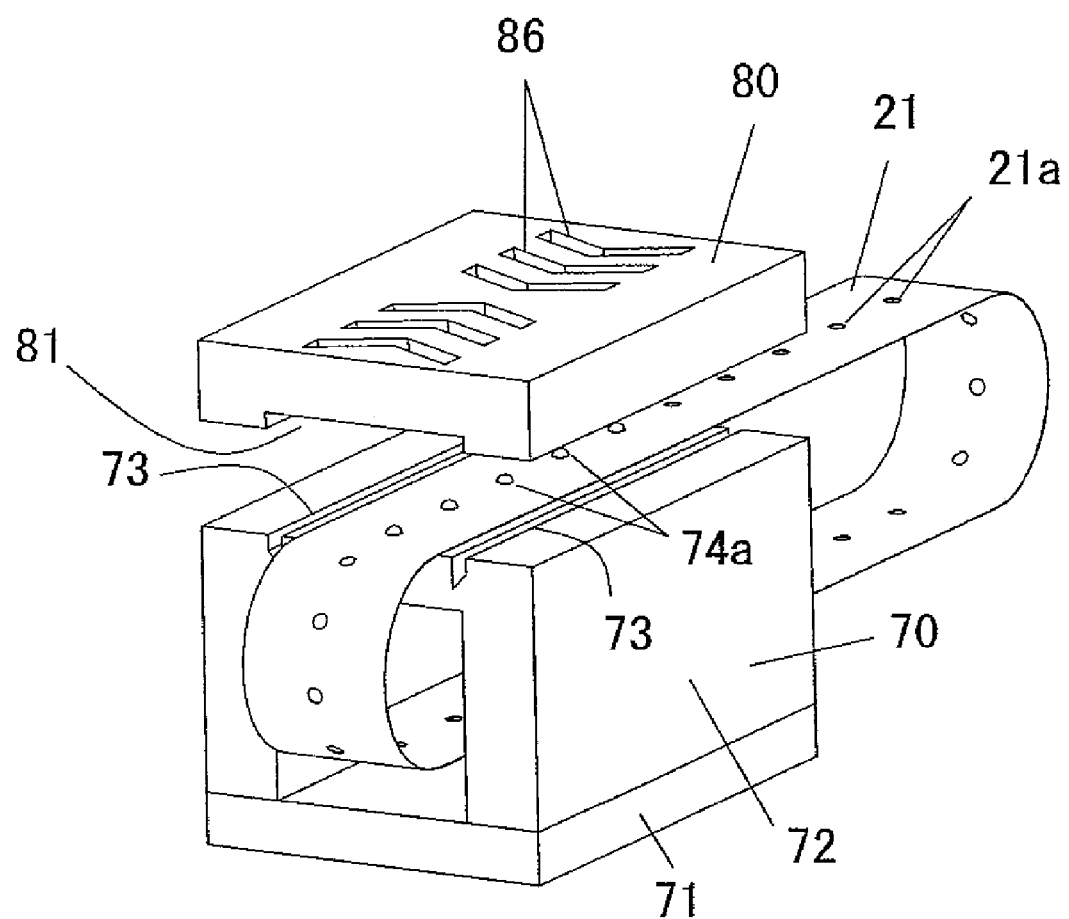
FIG. 8 is a perspective view of equipment used for manufacturing the crawler belt.

Manufacturing equipment and a method for manufacturing the crawler belt 20 will be described hereinafter. As shown in FIG. 8, the manufacturing equipment comprises a lower mold 70 (or a first mold) and an upper mold 80 (or a second mold) that moves up and down with respect to the lower mold 70.

Figure 9:
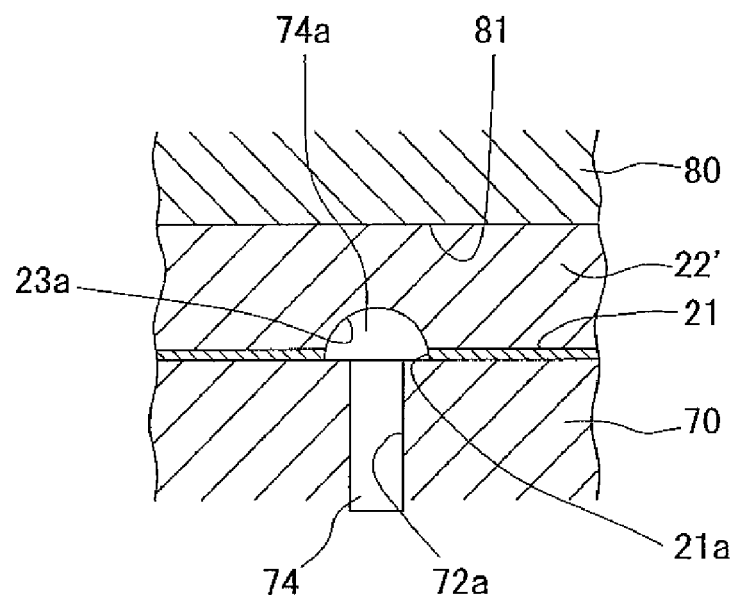
FIG. 9 is an enlarged longitudinal view of a main part of the equipment showing a belt main body of the crawler belt being molded.

The lower mold 70 includes a base section 71 and a molding section 72 having an inverted U-shaped cross-section, which are detachable from each other. The lower mold 70 has a hollow rectangular parallelepiped shape with both ends open. As shown in FIG. 9, the molding section 72 has receiving holes 72a arranged at even intervals in a longitudinal direction on an upper surface thereof. Mold pins 74 are removably received in the receiving holes 72. The mold pin 74 includes a head portion having a semi-spherical shape and being provided as a mold projection 74a. A pair of linear auxiliary mold recesses 73 for molding the shielding flange 24 are formed sandwiching a row of the mold projections 74a on the lower mold 70.

The upper mold 80 has a shape of a rectangular plate. The upper mold 80 has a shallow and wide mold recess 81 extending in a longitudinal direction thereof formed on a lower surface thereof. The upper mold 80 also has six lug mold recesses 86 formed therethrough from top to bottom. The lug mold recess 86 has a shape corresponding to that of the tread lug 26.

The steel belt 21 is passed through the hollow lower mold 70 and a part of the steel belt 21 is placed on the upper surface of the lower mold 70. At that time, the mold projections 74a of the lower mold 70 are fitted into the engagement holes 21a of the steel belt 21, thereby positioning the steel belt 21.

With the steel belt 21 positioned in the above described manner, a raw rubber sheet (elastic material, not shown) containing a vulcanizing agent and of a predetermined length is placed on the upper surface of the molding section 72 of the lower mold 70.

Then the upper mold 80 is lowered to press the raw rubber sheet and the molds 70, 80 are heated, thereby vulcanization-bonding (vulcanization-molding) a part 22' of the belt main body 22 (a part divided in a circumferential direction of the belt main body 22 to be formed to be endless) to the outer periphery of the steel belt 21 as shown in FIG. 9. It is preferable that primer (adhesive) is applied to an outer peripheral surface of the steel belt 21 beforehand to enhance strength of adhesion between the part 22' of the belt main body 22 and the steel belt 21.

At the time of the molding, a part of the base part 23 is molded with the mold recess 81, a part of the shielding flange 24 is molded with the auxiliary mold recess 73, the escape recess 23 is molded by allowing the mold projection 74a to press into the rubber material and the tread lug 26 is molded by allowing the rubber material to enter the lug mold recess 86. A part of the rubber material protruded from an upper opening of the lug mold recess 86 is removed with a spatula, etc.

Figure 10:
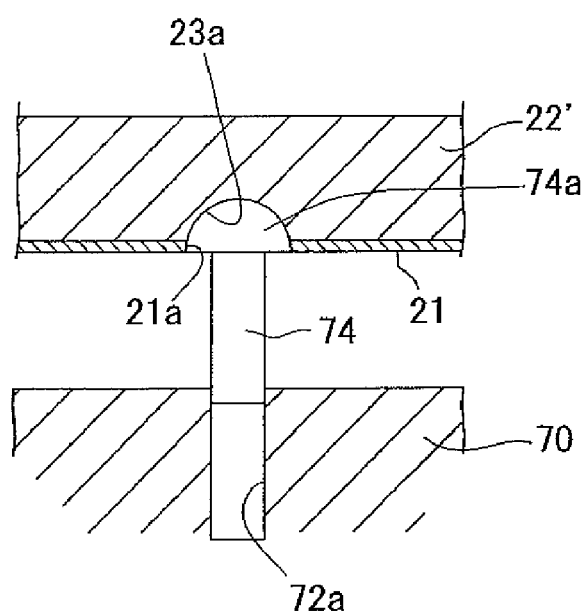
FIG. 10 is an enlarged longitudinal view of a main part of the equipment showing a molded part of the belt main body and the steel belt being removed from a lower mold.

After the molding is done as described above, the upper mold 80 is lifted. Then as shown in FIG. 10, the steel belt 21 is peeled off the lower mold 70. Since the molding of the rubber as described above involves contraction, the mold projection 74a is attached strongly to the rubber, and therefore the mold pin 74 is removed from the lower mold 70 together with the steel belt 21 and the part 22' of the belt main body 22.

Figure 11:
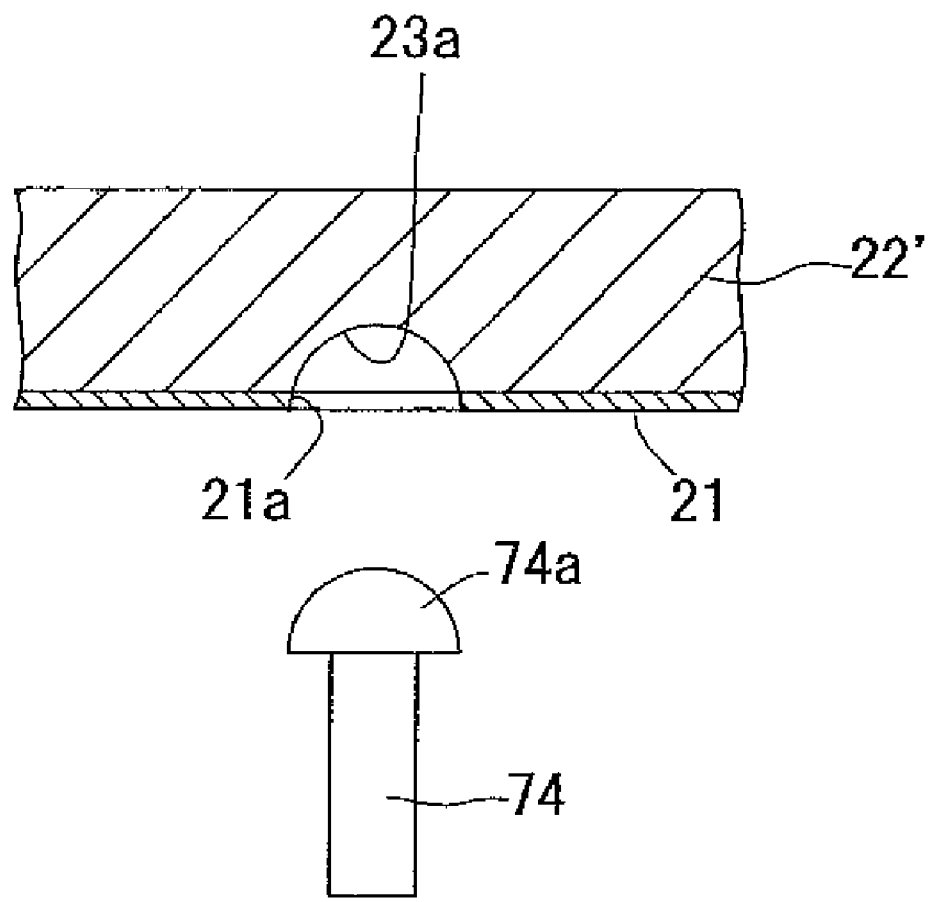
FIG. 11 is an enlarged longitudinal view of a main part of the equipment showing a mold pin being removed form a molded part of the belt main body and the steel belt.

Next, the mold pin 74 is removed from the steel belt 21 and the part 22' of the belt main body 22 as shown in FIG. 11. Since the mold pin 74 is separate from the lower mold 70, the mold pin 74 can be easily detached from the escape recess 23a of the part 22'. The productivity is improved compared to a case where mold projections are integrally formed with the lower mold.

Next, a new part of the steel belt 21 is positioned on the lower mold 70, the new part adjoining the part to which the part 22' of the belt main body 22 is vulcanization-bonded, by moving the steel belt 21 in a circumferential direction, and another part 22' of the belt main body 22 is molded in the foregoing way. By repeating the procedure, the belt main body 22 can be attached to the entire periphery of the steel belt 21. The part 22' of the belt main body 22 newly molded is made continuous to the previously molded part 22', thereby making the adjoining parts 22' of the belt main body 22 substantially integral with each other. According to this method, the crawler belt 20 including the shielding flange 24 and the tread lug 26 can be manufactured inexpensively by using the lower mold 70 and the upper mold 80, both of simple construction, without using a split mold.

Other embodiments of the present invention are described below referring to FIGS. 12 to 17. Same numbers are used for the components corresponding to those of the first embodiment and a detailed description thereof is omitted.

Figure 12:
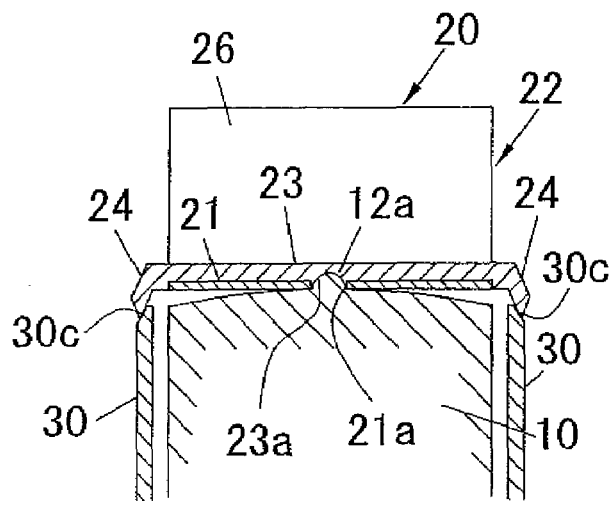
FIG. 12 is a longitudinal sectional view of a crawler unit according to a second embodiment of the present invention.

In a second embodiment as shown in FIG. 12, an outer peripheral surface of the wheel 10 is a generally-cylindrical surface. To be more specific, the outer edge of the cross section of the wheel has a crowned shape of a large radius of curvature with a central part elevated from opposite ends. In other words, outer diameter of the wheel 10 is gradually reduced as it goes from a center toward opposite ends in a width direction. Although exaggerated in the drawings, the difference between the diameters at the center and at the both ends of the wheel 10 is, in fact, not substantial: the diameter at the center is 100 millimeters and the diameter at the both ends is smaller than that by 0.3 millimeters in the wheel 10 having a width of 30 millimeters in this embodiment.

Figure 13:
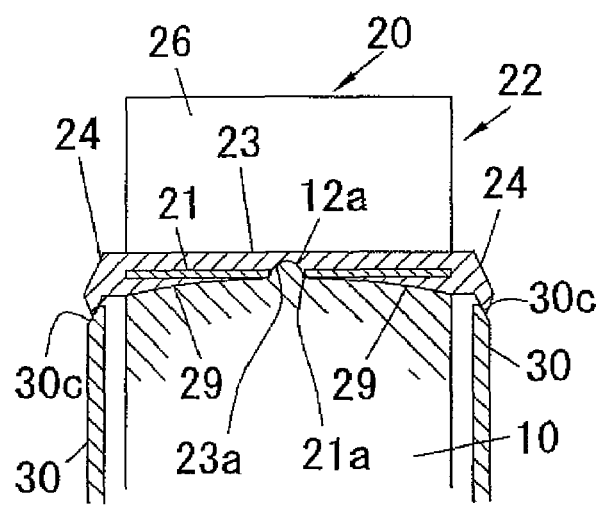
FIG. 13 is a longitudinal sectional view of a crawler unit according to a third embodiment of the present invention.

A third embodiment as shown in FIG. 13 is identical to the second embodiment except the following: the steel belt 21 is embedded in the base part 23 of the belt main body 22 and a thin rubber layer 29 is formed on an inner periphery of the steel belt 21. The rubber layer 29 has an inner-peripheral surface corresponding to the outer peripheral surface of the wheel 10. When the wheel 10 is made of metal, the rubber layer 29 serves to prevent abrasion caused by metal-to-metal contact between the steel belt 21 and the wheel 10.

Figure 14:
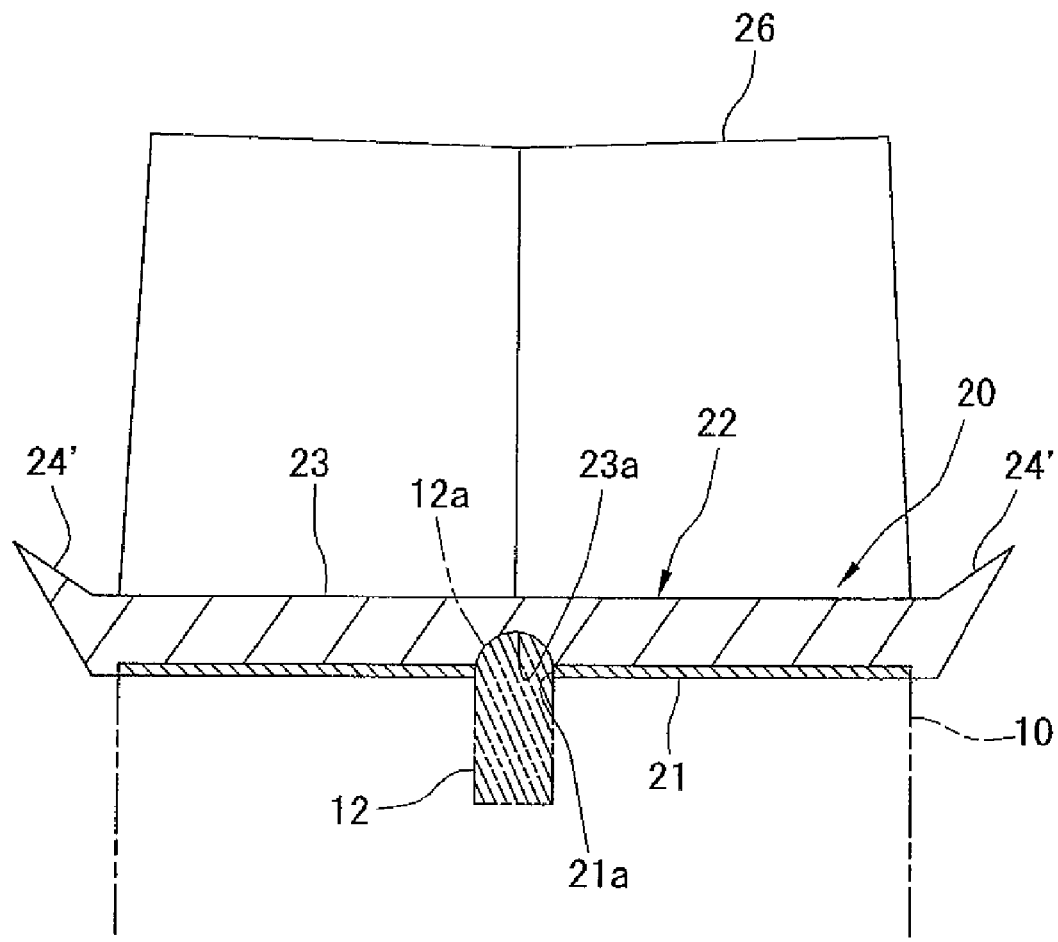
FIG. 14 is an enlarged longitudinal sectional view of a crawler belt according to a fourth embodiment of the present invention.
Figure 15:
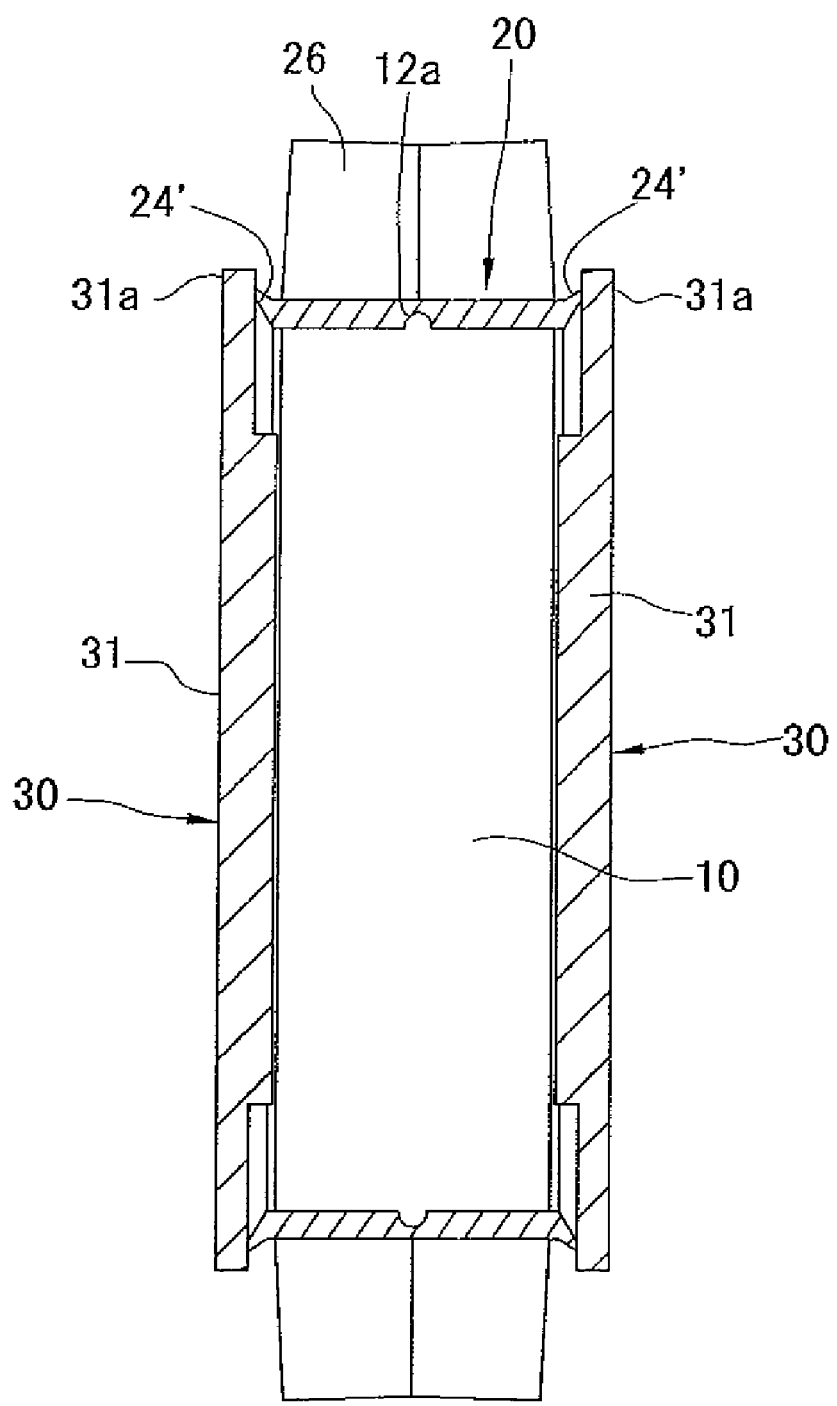
FIG. 15 is a longitudinal sectional view showing a seal structure between the crawler belt and an end edge of a side plate according to the fourth embodiment of the present invention.
Figure 16:
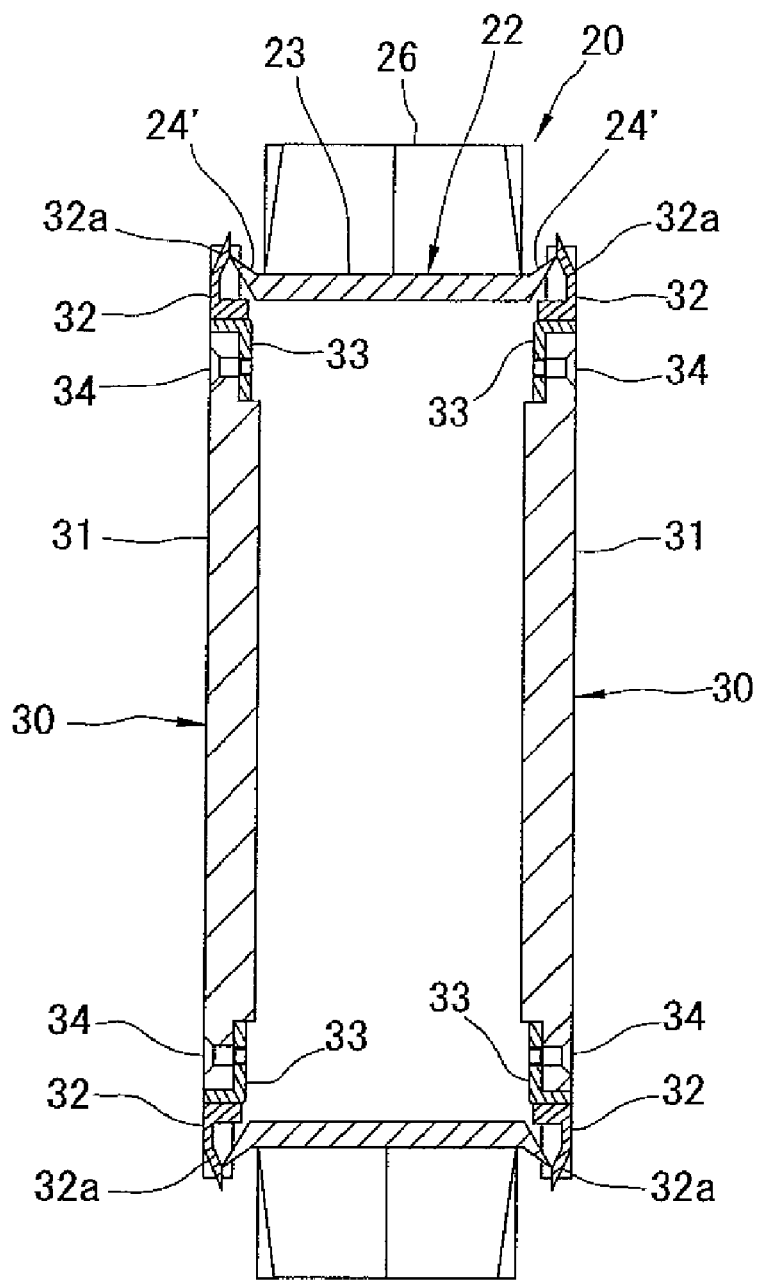
FIG. 16 is a longitudinal sectional view showing a seal structure between the crawler belt and a middle part of the side plate according to the fourth embodiment of the present invention.

In a fourth embodiment as shown in FIGS. 14 to 16, the wheel 10 is made of resin, etc. and its outer peripheral surface is a cylindrical surface. Engagement pins 12 made of metal are embedded and arranged at even intervals in a circumferential direction at a center in the width direction of the outer peripheral surface of the wheel 10. A head part of the engagement pin 12 having a semi-spherical shape projects from the outer peripheral surface of the wheel 10 and is provided as an engagement projection 12a.

A shielding flange 24' is formed continuously all around periphery of the belt main body 22 and projects in an oblique direction from an outer peripheral surface of the base part 23. The shielding flange 24' has a tapered cross-section and is easy to be elastically deformed.

As shown in FIG. 16, the side plate 30 comprises a metal plate 31 and a pair of seal members 32. As shown in FIG. 15, the metal plate 31 has a front and rear end edges 31a, each having a semi-circular shape corresponding to a shape of a peripheral edge of the front and rear wheels 10, respectively. The front and rear end edges 31a are, as shown in FIG. 15, cut away from inside to be reduced in thickness.

As shown in FIG. 16, the seal member 32 is detachably attached to an upper and lower parts of the peripheral edges of the metal plate 31, the upper and lower parts having a linear shape. To be more specific, the seal member 32 is made of rubber material having smaller elastic coefficient than the belt main body 22 of the crawler belt 20 to be described later. The seal member 32 is attached to a bracket 33 having a linear shape with a L-shaped cross section by vulcanization bonding, etc. and the bracket 33 is removably fixed to upper and lower parts of the peripheral edge of the side plate 30 with a screw 34. The seal member 32 includes a thin raised wall 32a.

In the part of the crawler belt 20 which is placed around the wheels 10 in the front and rear, the edge of the shielding flange 24 contacts the end edges 31a in the front and rear of the side plate 30. In the other part of the crawler belt 20 which is placed between the wheels 10 in the front and rear, the edge of the shielding flange 24' contacts the raised wall 32a of the seal member 32. As a result, the inner space surrounded by the crawler belt 20 and the pair of side plates 30 is sealed, thereby preventing foreign substances such as water, sands and dust from entering into the inner space.

In the part of the crawler belt 20 which is placed around half of the periphery of the wheels 10, the crawler belt 20 is bent, and therefore, the shielding flange 24' is warped away from the end edge 31a of the side plate 30. But the edge of the shielding flange 24' can contact the end edge 31a securely despite the warping because the edge of the shielding flange 24' is elastically deformed as it contacts the end edge 31a of the side plate 30. When the shielding flange 24' of the crawler belt 20 contacts the seal member 32 at the upper and lower parts of the peripheral edge of the side plate 30, the seal member 32 is deformed more greatly than the shielding flange 24' because the seal member 32 has smaller elastic coefficient and is thinner than the shielding flange 24'. This permits the seal member 32 and the shielding flange 24' to be maintained in contact with each other even when the crawler belt 20 flaps in an area not restrained by the wheels 10 because the seal member 32 is deformed following the flapping of the belt 20. The seal member 32 is coated with Teflon®, etc., which serves to reduce friction between the seal member 32 and the shielding flange 24'.

Figure 17:
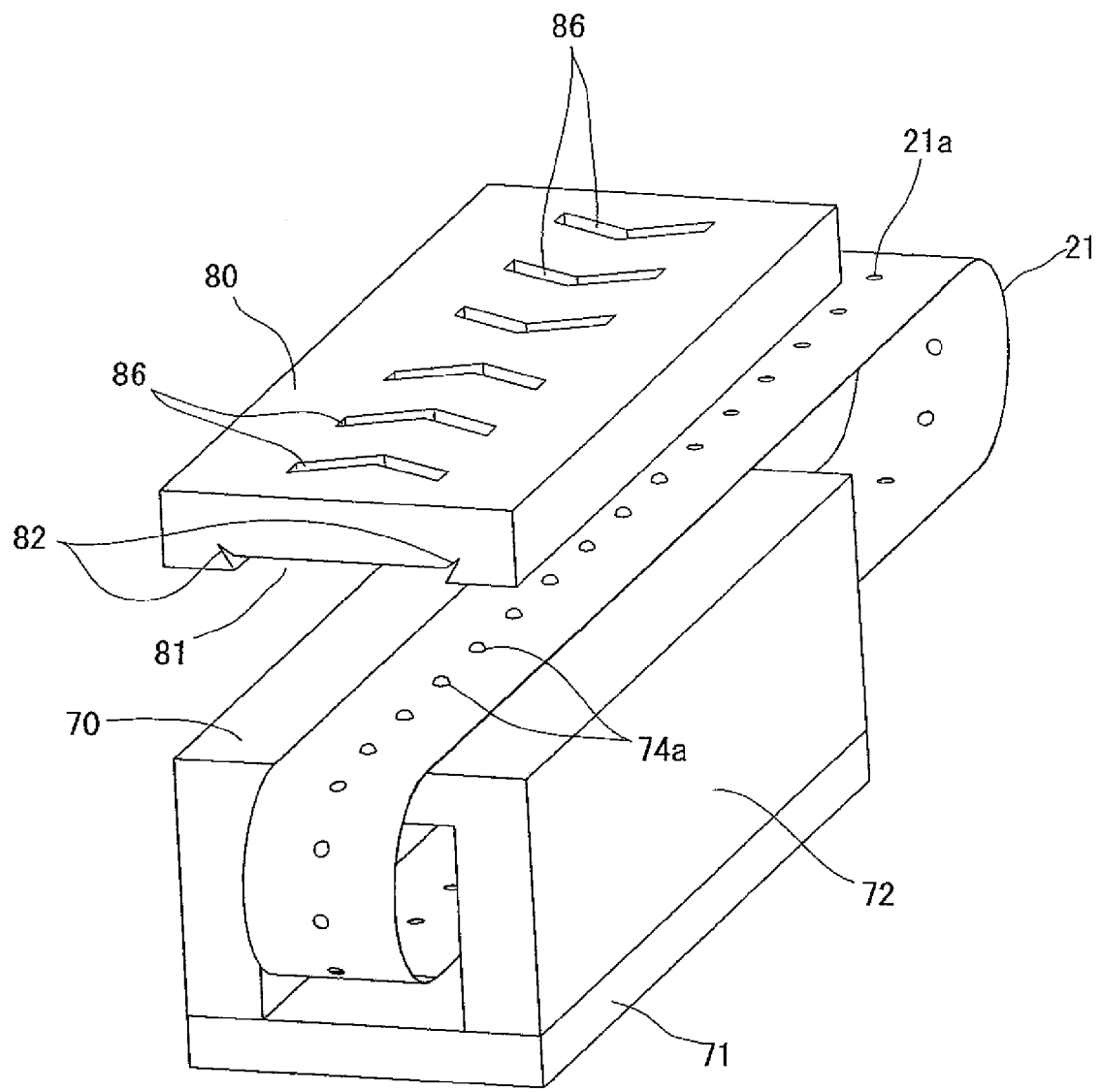
FIG. 17 is a perspective view of equipment used for manufacturing the crawler belt according to the fourth embodiment of the present invention.

The lower mold 70 and the upper mold 80 as shown in FIG. 17 are used to mold the crawler belt 20 according to the fourth embodiment of the present invention. In this embodiment, a pair of auxiliary mold recesses 82 having a linear shape are formed along opposite sides of the mold recess 81 of the upper mold 80. The auxiliary mold recess 82 has a cross-section corresponding to the shield flange 24'. The molds 70 and 80 are used in the same manner as in the first embodiment as described above.

The present invention is not limited to the above embodiments, but various modifications can be made without departing from the scope of the invention. For example, the pair of crawler units may be driven by both of front and rear wheels. Another wheel may be deployed between the wheels in the front and rear. A trailing wheel may not be engaged with the crawler belt as far as it restricts movements of the crawler belt in the width direction.

The tread lug 26 may have a planer shape of a wave being bent at a plurality of points. The tread lug 26 according to the first and second embodiments may not have a trapezoidal longitudinal section but may be formed with a uniform thickness. Two rows of short helical engagement projections running in different directions (double helical) may be formed on the wheel 10 and engagement holes corresponding to the helical engagement projections may be formed in the high-tensile-strength belt so that the crawler belt is surely prevented from meandering.

The entire periphery of the belt main body may be molded at one time by insert injection molding, etc. The actuator may not be an electric motor but a hydraulic motor or an engine. Application of the crawler unit according to the present invention is not limited to the rescue robots. It may be applied to other light weight robots such as those used for cleaning hospitals or may be applied to light construction machines other than robots.

The invention claimed is:

1. A crawler belt comprising an endless high-tensile-strength belt and a belt main body made of elastic material and attached to an outer periphery of said high-tensile-strength belt, said high-tensile-strength belt having engagement holes arranged at even intervals in a circumferential direction thereof, said engagement holes to engage with engagement projections of a wheel, said belt main body integrally including an endless base part attached all around an outer periphery of said high-tensile-strength belt and a plurality of tread lugs formed spacedly on an outer periphery of said base part, wherein an inner periphery of said base part is completely contacting the entire outer periphery of said high-tensile-strength belt, said base part covering said engagement holes and having escape recesses formed at locations corresponding to said engagement holes of said high-tensile-strength belt, said escape recesses to receive said engagement projections of said wheel.

2. A crawler unit comprising a plurality of wheels disposed separately in a front and rear direction and a crawler belt trained about said wheels, wherein said crawler belt comprises an endless high-tensile-strength belt and a belt main body made of elastic material and attached to an outer periphery of said high-tensile-strength belt, said high-tensile-strength belt having engagement holes arranged at even intervals in a circumferential direction thereof, said belt main body integrally including an endless base part attached all around said outer periphery of said high-tensile-strength belt and a plurality of tread lugs formed spacedly on an outer periphery of said base part, wherein an inner periphery of said base part is completely contacting the entire outer periphery of said high-tensile-strength belt, said base part covering said engagement holes and having escape recesses formed at locations corresponding to said engagement holes of said high-tensile-strength belt, and wherein a driving wheel of said plurality of wheels has engagement projections arranged at even intervals in a circumferential direction on an outer peripheral surface thereof, said engagement projections being adapted to be engaged with said engagement holes of said high-tensile-strength belt of said crawler belt and at the same time to enter said escape recesses of said belt main body.

3. A crawler unit according to claim 2, wherein outer peripheral surfaces of said plurality of wheels are generally cylindrical surfaces.

4. A crawler unit according to claim 3, wherein said engagement holes of said high-tensile-strength belt have a generally circular shape, said engagement projections of said wheel have a generally semi-spherical shape and said escape recesses of said base part have a generally semi-spherical shape.

5. A crawler unit according to claim 2, wherein said crawler unit further comprises a pair of side plates extending in a front and rear direction to cover opposite side surfaces of said plurality of wheels, said belt main body comprising shielding flanges continuously formed along an entire length on opposite sides of said base part, edges of said shielding flanges contacting peripheral edges of said side plates.

6. A crawler unit according to claim 2, wherein said tread lugs extend in a width direction of said base part, said tread lugs having a planar shape bent at least at one point, the height of said tread lugs being not less than 3 times and not greater than 7 times as large as the thickness of said thread lugs.

7. A crawler belt according to claim 1, wherein said belt main body is attached only to the outer periphery of the high-tensile-strength belt.

8. A crawler belt according to claim 7, wherein the high-tensile-strength belt is composed of a steel belt.

9. A crawler unit according to claim 2, wherein the high-tensile-strength belt directly contacts the outer peripheral surface of the wheel.

* * * * *